Patented Aug. 2, 1932

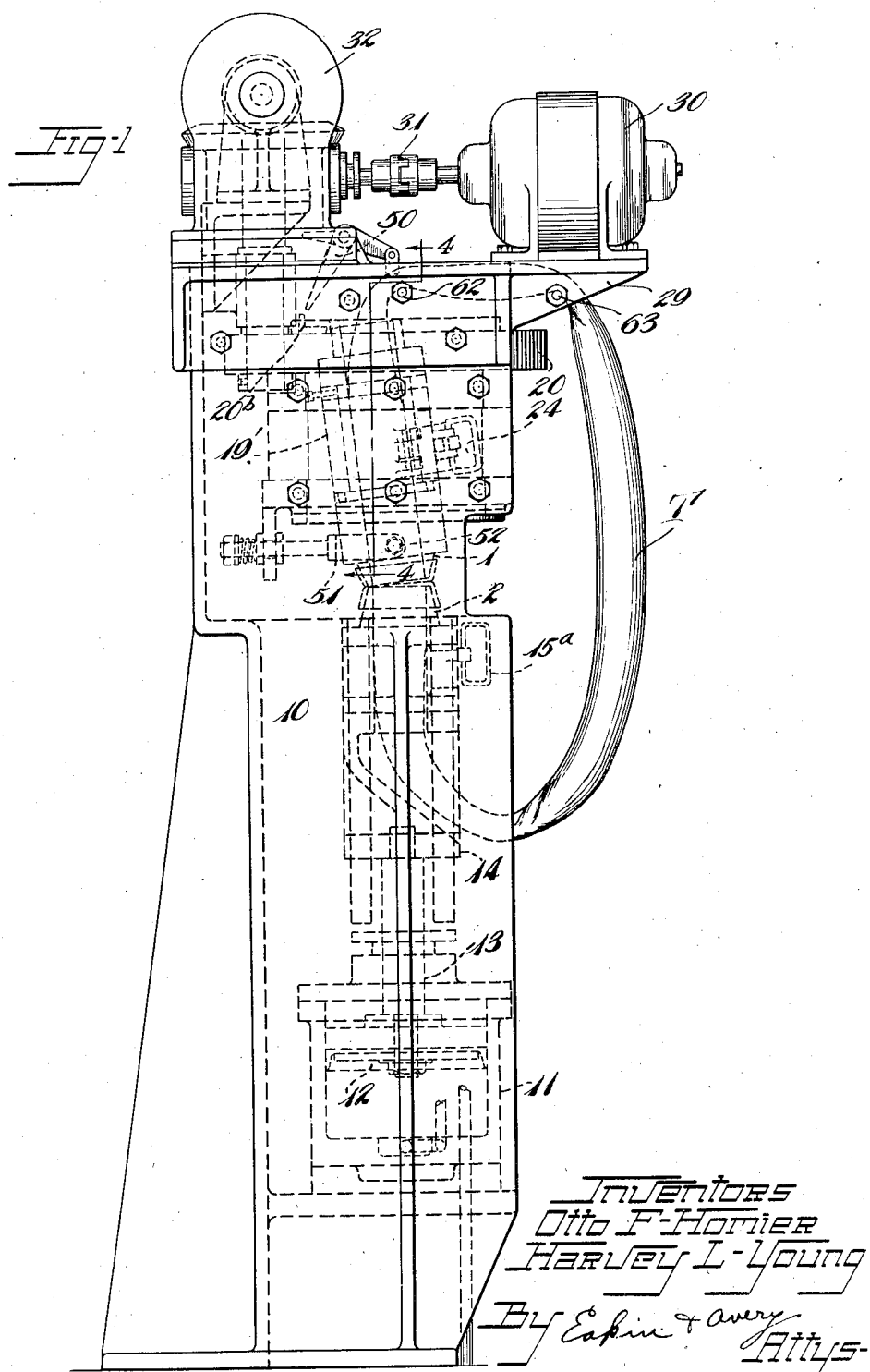

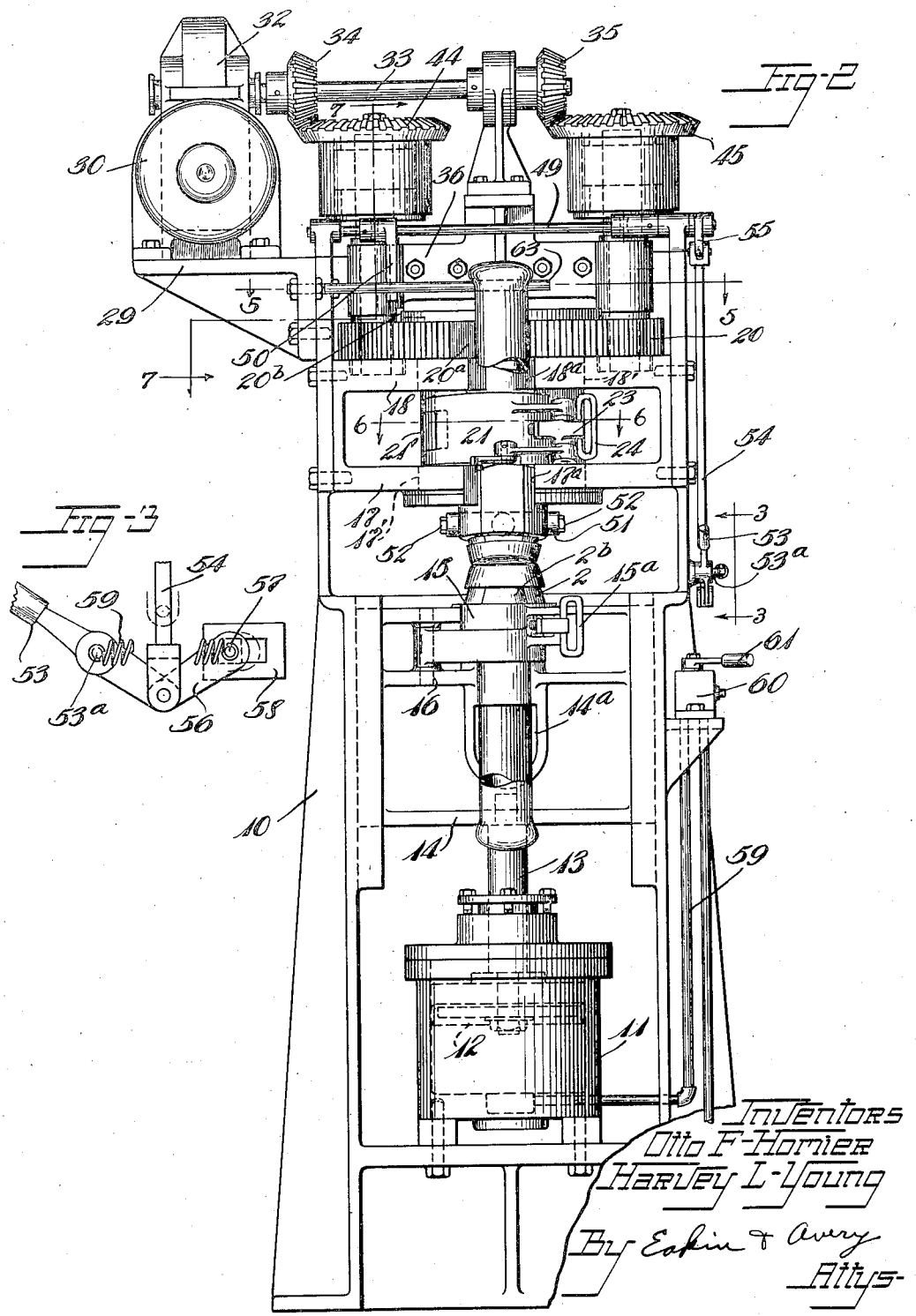

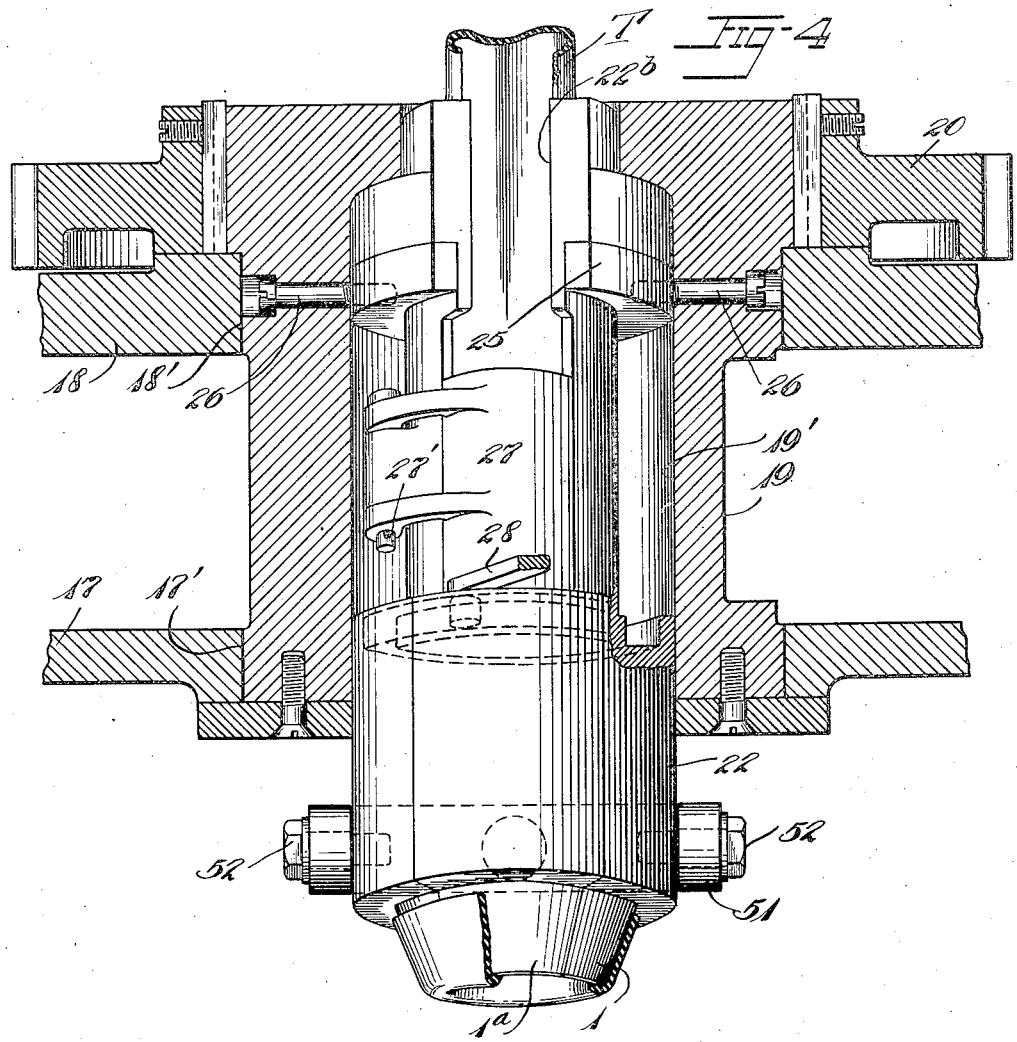

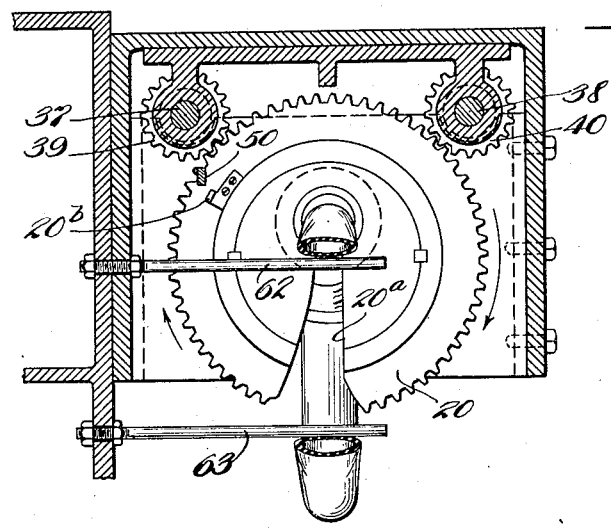
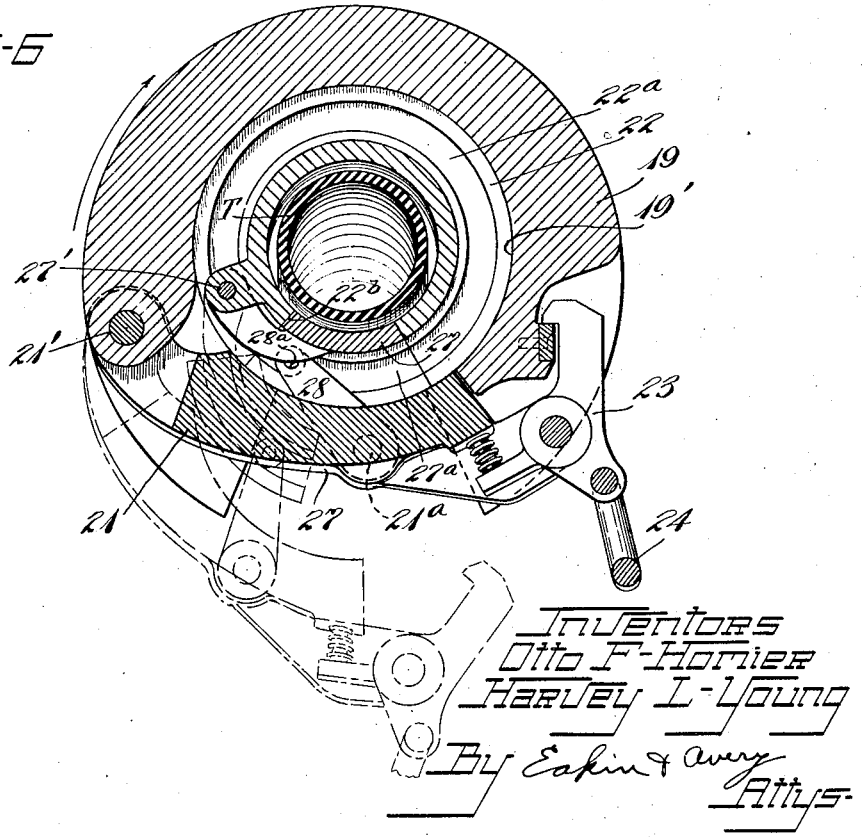

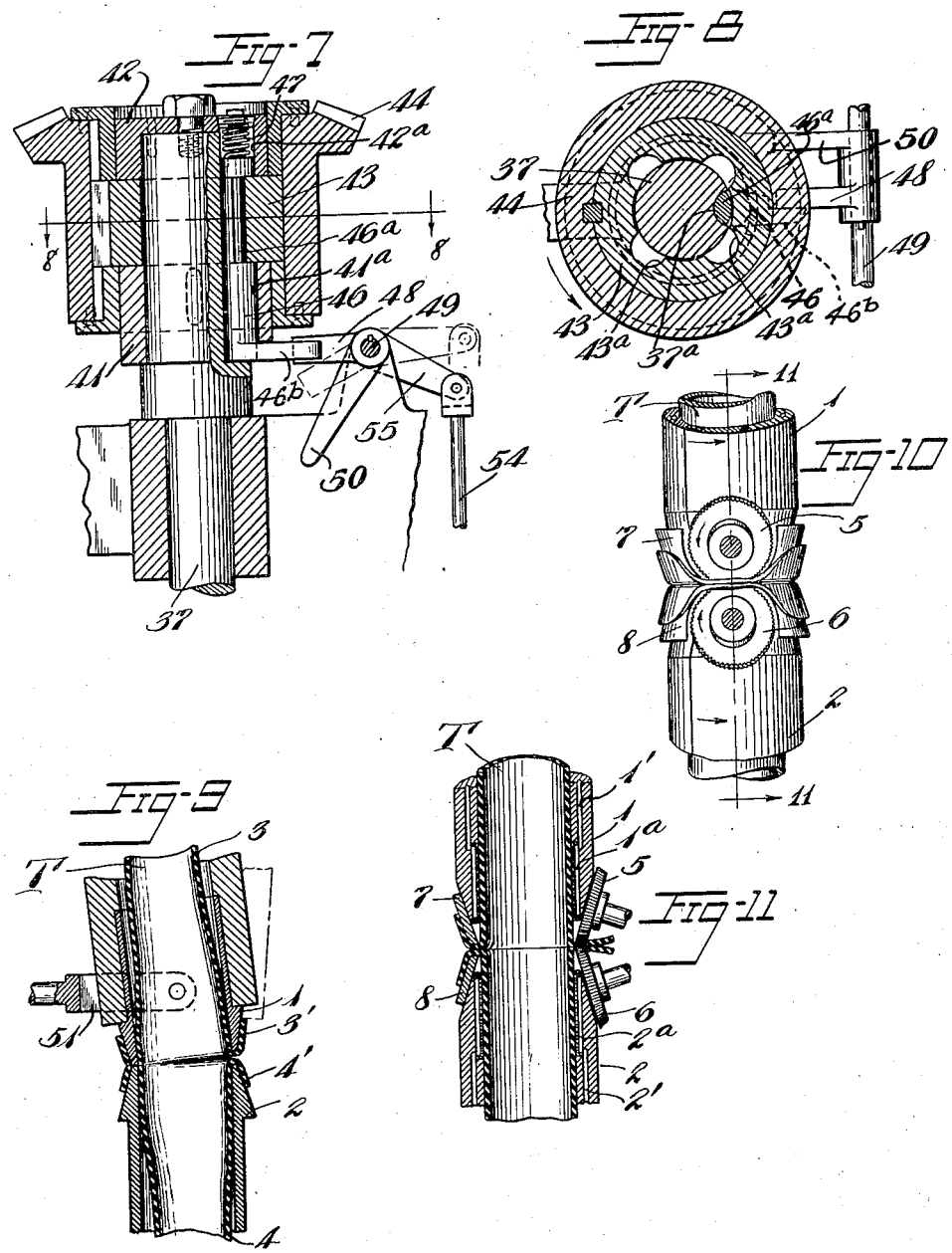

1,869,690

UNITED STATES PATENT OFFICE

OTTO F. HOMIER AND HARVEY L. YOUNG, OF AKRON, OHIO, ASSIGNORS TO THE B. F. GOODRICH COMPANY, OF NEW YORK, N. Y., A CORPORATION OF NEW YORK

METHOD AND MACHINE FOR SPLICING RUBBER TUBES

Application filed July 26, 1930. Serial No. 470,833.

Our invention relates to a method of splicing tubes for pneumatic tires or for splicing other similar tubing, and to apparatus for carrying out the method. More particularly, the invention relates to a method of cut-splicing or seaming unvulcanized rubber tubes during their manufacture and to a machine for cut-splicing or seaming tubes.

Methods have heretofore been proposed whereby the ends of the tubes to be spliced are cuffed over tubular cutting dies adapted to be forced toward each other until the cuffed portions are pinched off between the dies and the tubes are seamed in abutting relation.

One of the objects of our invention is to devise a method of performing the seaming and/or cutting operation whereby a strong seam may be obtained without the application of such great force as has been necessary in prior practices. A further object is to provide for conveniently obtaining high pressure per unit of area of the joined faces of the stock.

Other objects are to provide conveniently for progressively seaming together a pair of tube ends and to provide a rubbing of the meeting surfaces to cause a thorough coalescing of the edges, to produce a stronger joint, and to avoid the adhesion-preventing effect of foreign matter such as dust particles in the seam.

Another object is to provide apparatus by means of which our method may be conveniently performed.

Other objects of the invention will be apparent from the following description and claims.

In the drawings:

Fig. 1 is a side elevation of our apparatus for splicing tubes,

Fig. 2 is a front elevation of the same,

Fig. 3 is a detail view of part of the clutch-operating mechanism, looking in the direction of 3—3 of Fig. 2, Fig. 4 is an enlarged vertical sectional view on line 4—4 of Fig. 1, showing the upper die member and its guiding and supporting mechanism, Fig. 5 is a horizontal section on line 5—5 of Fig. 2, Fig. 6 is a horizontal section on line 6—6 of Fig. 2, Fig. 7 is a vertical section on line 7—7 of Fig. 2, Fig. 8 is a horizontal section on line 8—8 of Fig. 7, Fig. 9 is a detail sectional view through the cutting and seaming dies illustrating the method of splicing, Fig. 10 is a detail elevation of the dies showing a modified form in which the dies are rotated and additional rotating cutters are provided for severing the flanges, and Fig. 11 is a detail sectional view of the seaming dies of the modified form of Fig. 10 illustrating the seam-compressing and trimming mechanism and vacuum holding mechanism.

Referring to the drawings, and particularly to Fig. 9, we utilize a pair of tubular opposed dies or seaming jaws 1 and 2 through which the tube ends 3 and 4 are passed and reversed as at 3', 4'. Such dies or seaming jaws are well known in the art as shown by the Coe Patent No. 1,693,637 and the Warner Patent 1,687,811 and may be of the types shown in either of these patents, or of any other desirable form. Suitable supporting means designed to force the dies or jaws toward each other may also be provided. In practicing our method, however, we provide, either by rotating the jaws on axes at a slight angle to each other, or by a wobbling motion imparted to one or more of the jaws, for progressively uniting the cuffed portions of the tube by progressive contact or approach of the jaws. This may be accomplished by holding the jaw 2 stationary while first causing the upper jaw to approach to the full-line position of Fig. 9 and thereafter be a wobbling motion, such as a motion wherein the upper end of jaw 1 is moved in a circle while the lower end is maintained in alignment with the jaw 2, successively bringing the upper jaw in contact with the lower jaw. At half a revolution the upper jaw will assume the dotted line position shown in the figure.

Our invention may also be practiced by causing the jaws to approach each other while imparting a wobbling motion to both jaws, as by fixing their respective axes at points equally remote from the zone of the desired seam, and bodily moving their opposed ends in a closed path to effect progressive seaming.

Another way of practicing the invention is to arrange the axes of the jaws so that they are angularly disposed as in Fig. 9 and intersect at the abutting point, and by rotating both jaws on their respective axes in the same direction, as indicated by the arrows in Fig. 10, bringing successive points on the jaws in close proximity. The jaws 1 and 2 may be designed to simply seam the tube ends or to perform both the operations of cutting and seaming, and additional seaming and cutting means may be provided such as the rotating rolls or cutters 5 and 6 shown in Figs. 10 and 11. When such additional cutting means is used, it is desirable to have the jaws 1 and 2 adapted to be separated to the extent shown in Fig. 11, after the seaming operation, to enable the cutters 5 and 6 to cut the seam close to the outer wall of the tube. In this construction a pair of shields 7 and 8 are provided to hold the cuffed portions of the tube in position to be trimmed after the jaws 1 and 2 are withdrawn.

The jaws 1 and 2 may also be provided with means for gripping the tube such as the vacuum opening $1'$, $2'$, through which air may be withdrawn from the cavities $1^a$, $2^a$, the inner walls of which are porous, thereby causing the tube to be held against the jaws by differential pressure.

Referring now to the apparatus shown in Figs. 1 and 2, this consists generally of a frame 10, in the lower part of which is fixed a cylinder 11, containing a piston 12 and provided with a piston rod 13, whose upper extremity supports a cross-head 14, guided by the main frame 10, which in turn supports the lower die or seaming jaw 2. The seaming jaw is provided with a removable section $2^b$ which is fastened to a gate 15, pivoted at 16 on the cross-head 14 and forming with the cross-head a socket for supporting the die or seaming jaw. A suitable latch is provided for fastening the gate in closed position and may be operated by the handle $15^a$ when the gate is to be opened to remove the tube. Cross-head 14 is provided with a cavity $14^A$ communicating with the die 2 to provide clearance for the tube.

The upper part of the frame 10 carries a pair of vertically spaced cross-frame members 17 and 18, fastened thereto, in which a head 19 is journaled to revolve on a vertical axis in bearings $17'$ and $18'$, at the upper extremity of the head 19 is keyed a mutilated gear 20. This gear as well as cross members 17 and 18, and head 19 is slotted as at $20^a$, $17^a$, and $18^a$ to provide an opening for removing the tube from the machine. Head 19 is provided with a gate 21 hinged thereto at $21'$ and provided with a latch 23 and operating handle 24, (see Fig. 6). The gate when closed provides, in combination with the head 19, a continuous bearing for the upper die support.

Referring to Fig. 1, the head 19 is provided with angularly disposed chamber $19'$ for receiving the upper die support 22, (see Fig. 4). The axis of the chamber is so disposed as to intersect the axis of the lower seaming jaw 2, but is inclined in relation to the axis of the head 19 so that the upper end of the chamber is eccentric to the head 19. The upper die support 22 is held in the chamber against downward displacement by a segmental ring 25, held in position by screws 26, and is provided with a gate 27, hinged thereto at $27'$ for closing a vertical slot $22^b$ extending therethrough to admit the inner tube T. The die support is machined to provide an annular groove $22^a$ which is continued through the gate 27 as a groove $27^a$.

A link 28, is pivoted at $21^a$ to the gate 21, and, at the other end, is provided with a pin $28^a$ entering the grooves $22^a$ and $27^a$ (see Fig. 6). When the head 19 and upper die support 22 are in the positions shown in Fig. 6 and the gate 21 is operated the link 28 will operate to simultaneously open the gate 27 as shown by the dotted line position, which represents the parts as opened, but when gate 21 is closed, the upper die support may freely revolve in the head 19 or vice versa.

The upper seaming die or jaw 1 is fastened to the die support and has a separable segment $1^a$ which is fastened to the upper die support gate 27. It will therefore be seen that we have provided means whereby the entire upper part of the apparatus may be opened to provide a slot for placing or removing tubes in the upper die or seaming jaw.

We have provided means for revolving the upper die supporting head 19 as follows: Mounted upon a bracket 29 is an electric motor 30, which is connected by a flexible coupling 31 to a reducing mechanism 32 preferably of the worm type, which in turn drives a horizontal shaft 33 journaled in the machine frame and bevel pinions 34 and 35 fixed thereon.

Mounted on the frame 10 is a cross-member 36 in which are journaled a pair of vertical shafts 37 and 38 fixed to the lower extremities of which are pinions 39 and 40. On the upper end of shaft 37 are keyed a collar 41 and a cap collar 42. Between these a collar 43 is normally free to rotate and carries a bevel gear 44 keyed thereto meshing with pinion 34. Shaft 38 carries a bevel gear 45 similarly mounted for engagement with the pinion 35.

Means are provided for clutching the gears 44 and 45 to their respective shafts as follows:

Referring to Figs. 7 and 8 collars 41 and 42 are each provided with a longitudinal half round groove $41^a$, and $42^a$ in vertical alignment with each other, and the shaft 37 is provided with a mating groove $37^a$ which cooperates with those in collars 41 and 42 to form a passage of circular cross-section. A rocking pin 46 is confined in said passage and is provided with a relieved clearance portion $46^a$ adjacent the collar 43 and an outwardly extending arm $46^b$ at its lower end. A torsion spring 47 is mounted in the passage above the pin 46 and has one end attached to the pin 46 and the other to the cap collar 42.

Collar 43 is grooved to provide one or more internal half-round slots $43^a$. A lever 48 is fulcrumed on a rod 49 and normally has one end extending in such position as to engage the arm $46^b$ and hold the pin 46 in the relation shown in Figs. 7 and 8. Should the lever 48 be moved to the dotted line position of Fig. 7 the coil spring 47 will tend to turn the pin 46 and by reason of the fact that shaft 37 is not rotating, as collar 43 rotates to such a position that one of the slots $43^a$ is opposite pin 46, the pin will be rotated by the spring 47 and collar 43 and gear 44 will be locked to the shaft 37. Through shaft 37 and pinion 39 the motor may now rotate gear 20. Gear 45 and shaft 38 are provided with similar mechanism simultaneously operated by a common fulcrum rod 49. Gear 20 is provided with a stop $20^b$, and rod 49 is provided with a depending arm 50. When rod 49 is rocked to engage the clutches as just described, arm 50 will be moved into the path of stop $20^b$. After one complete revolution of gear 20, stop $20^b$ will engage arm 50 and by rocking rod 49 retract pins 46 to the position of Fig. 8, whereupon, the power being disconnected, gear 20 and head 19 will cease to rotate. The mechanism may of course be varied from the preferred form as long as the same result is accomplished. By providing two driving pinions 39 and 40 constant drive of gear 20 is assured, notwithstanding the notch $20^a$ therein, as one pinion will always be in engagement with the gear.

Means are provided to restrain the upper die or seaming jaw from rotating with the gear 20 and head 19. This consists of a yoke 51 pivotally engaging the bolts 52 and having a shank $51^a$ extending through an opening in the stationary frame member 17, through which it may freely move in a lengthwise direction.

For the purpose of operating the clutch mechanism we provide a handled lever 53, fulcrumed at a convenient location on the main frame 10 by the stud $53^a$. A vertically disposed connecting rod 54 is pivoted at its upper extremity to an arm 55 fixed to the clutch operating rod 49, and at its lower extremity to one end of lever 53 and also to one end of a link 56. A pin 57, on link 56, is free to slide in a slotted block 58 fast to the frame 10 and a tension spring 59 connects pin 57 and stud $53^a$ tending to normally hold pin 57 in its near position to stud $53^a$. It will be understood that by this mechanism, which we may designate as an over-center holding mechanism, rod 49 will be normally held in one of its extreme positions. The rod 54 will normally be in the full-line position of Fig. 3, and the gear 20 will be at rest. If the lever 53 is now depressed the rod 54 will be moved to the dotted line position of Fig. 3, and will be there held by the springs 59, the rod 49 will be rotated to depress the free end of lever 48, engaging through rod 49, the clutches on shafts 37 and 38, and thereby causing gear 20 to rotate through one revolution, whereupon stop $20^b$ will contact with arm 50, thereby rotating rod 49 in the reverse direction, and raising the free ends of arms 48 to a position in the paths of arm $46^b$. On further rotation of shafts 37 and 38 arms $46^b$ will contact with arms 48 and rock the pins 46 to release shafts 37 and 38 from gears 44 and 45, thereby discontinuing the rotation of gear 20. Stop $20^b$ is so located that the gear 20 will stop with its open side $20^a$ as shown in Fig. 2, aligned with openings $17^a$ and $18^a$ in the cross members 17 and 18 in which the head 19 rotates, whereby an open passage for inserting and removing the tube is provided when the gate 21 is opened.

For controlling the lower seaming die or jaw, fluid under pressure is admitted to the lower end of the cylinder 11 by means of a pipe 59 and is controlled by a valve 60 operated by a handle 61. The valve being conveniently mounted on the frame of the machine.

The operation of the various mechanisms has been heretofore explained. The general operation of the device is as follows: With the piston 13 in lowered position and with the head 19 stationary, the operator opens the gates 15 and 27 and inserts the tube ends to be joined in the respective seaming dies or jaws. The gates 15 and 27 are then closed and the protruding ends of the tube are cuffed back over the dies as shown in the drawings. Valve 60 is then operated to admit fluid below the piston 12 raising the lower die to bring the cuffed ends in contact at the back of the dies as shown in Fig. 9. Lever 53 is now depressed to start the rotation of head 19 which thereafter revolves through one complete revolution and stops. During such movement of the head 19 the upper die supporting member will be restrained from rotation by the yoke 51, but due to the fact that it is journaled in the head 19 on an axis inclined to that of the head 19, its axis will be rotated around a conical surface and during such rotation the upper die 1 will successively present each point of its edge in extreme advanced position thereby progressively seaming the tube. Thereafter, the head 19 will cease rotating, the lower die may be lowered by manipulating valve 60, and the seamed tube may be removed by opening the gates 15 and 27.

Where it is desired to splice the ends of one tube to provide an endless tube we provide supporting rods 62 and 63 to support the upper part of the tube so as not to interfere with the gear 20. These rods extend from one side only of the machine frame, so that the tube may be readily removed therefrom when desired.

What we claim is:

1. The method of splicing tube ends which comprises adhesively uniting respective annular zones of the inner faces thereof in an annular seam by applying pressure to their outer faces by progression along the seam, and progressively trimming the excess material from the seam.

2. The method of splicing tube ends which comprises cuffing back the tube ends, holding the cuffed-back portions thereof out of contact with the underlying portions thereof and adhesively uniting respective annular zones of the inner faces thereof in an annular seam by applying pressure to their outer faces by progression along the seam.

3. The method of splicing tube ends which comprises effecting a relative angular movement of the ends and adhesively uniting respective annular zones of the inner faces thereof by applying pressure to their outer faces by progression along the seam.

4. The method of splicing tube ends which comprises rotating the tube ends on nonparallel axes and adhesively uniting respective annular zones of the inner faces thereof in an annular seam by applying pressure to their outer faces by progression along the seam.

5. Apparatus for splicing tube ends comprising means for supporting a pair of tube ends in opposed relation, and means for effecting seaming of annular zones of their inner faces by pressure applied to their outer faces to unite the tube ends by progression along an annular seam.

6. Apparatus for splicing tube ends comprising means for supporting a pair of tube ends in opposed relation, and means for effecting trimming thereof by pressure progressively applied to their outer faces along an annular line of trim.

7. Apparatus for splicing tube ends comprising means for supporting a pair of tube ends in opposed relation, and means for effecting seaming of annular zones of their inner faces and trimming the surplus therefrom by pressure progressively applied to their outer faces circumferentially of the tube ends along the line of seam.

8. Apparatus for splicing tube ends comprising means for supporting a pair of tube ends in opposed relation, means for holding cuffed portions thereof from contact with said tube ends, and means for effecting seaming of annular zones of their inner faces by pressure progressively applied to their outer faces to unite the tube ends along an annular seam.

9. Apparatus for splicing tube ends comprising means for supporting a pair of tube ends in opposed relation, means for pressing the supported ends toward each other, and means for effecting a relative angular movement of the supports to unite annular zones of the tube ends.

10. Apparatus for splicing tube ends comprising a non-rotating tube-end supporting member, a tube-end supporting member in opposed relation to said member with its axis angularly disposed thereto, and means for effecting movement of said last named member in rolling relation to said first named member.

11. Apparatus for splicing tube ends as defined in claim 10 including means for effecting movement of the non-rotating member toward and from the other member.

12. Apparatus for splicing tube ends as defined in claim 10 in which the tube-end supporting members are provided with removable gate sections adapted to permit removal of an endless spliced tube.

13. Apparatus for splicing tube ends as defined by claim 10 in which the means for effecting movement includes a revoluble head provided with an angularly disposed chamber in which the tube-end supporting member is journaled, and means for rotating the head around the tube-end supporting member.

In witness whereof we have hereunto set our hands this 24th day of July, 1930.

OTTO F. HOMIER.
HARVEY L. YOUNG.